(12) United States Patent
Yarbrough et al.

(10) Patent No.: US 10,760,544 B2
(45) Date of Patent: Sep. 1, 2020

(54) SEALING MEMBERS FOR JOINTED ROTOR BLADE ASSEMBLIES

(71) Applicant: General Electric Company, Schenectady, NY (US)

(72) Inventors: Aaron A. Yarbrough, Greenville, SC (US); Christopher Daniel Caruso, Greenville, SC (US); Donald Joseph Kasperski, Simpsonville, SC (US); Daniel Alan Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 645 days.

(21) Appl. No.: 15/186,579

(22) Filed: Jun. 20, 2016

(65) Prior Publication Data

US 2017/0363063 A1  Dec. 21, 2017

(51) Int. Cl.
*F03D 9/25* (2016.01)
*F03D 1/06* (2006.01)

(52) U.S. Cl.
CPC ............ *F03D 1/0675* (2013.01); *F03D 9/25* (2016.05); *F05B 2220/30* (2013.01);
(Continued)

(58) Field of Classification Search
CPC ............ F05B 2240/57; F05B 2240/572; F05B 2240/302; F05B 2280/4004;
(Continued)

(56) References Cited

U.S. PATENT DOCUMENTS 7,854,594 B2 * 12/2010 Judge .................... B29C 66/124
416/226
8,172,539 B2 * 5/2012 Kootstra ............... F03D 1/0658
416/223 R
(Continued)

FOREIGN PATENT DOCUMENTS

DE  102007020439 A1  10/2007
EP       2317124 A2   5/2011
(Continued)

OTHER PUBLICATIONS

EPO Machine Generated Translation of WO 0146582 A2 (Year: 2001).*

*Primary Examiner* — Aaron R Eastman
*Assistant Examiner* — Theodore C Ribadeneyra
(74) *Attorney, Agent, or Firm* — Dority & Manning, P.A.

(57) ABSTRACT

A jointed rotor blade assembly may include a first blade segment having a first outer shell terminating at a first joint end and a second blade segment coupled to the first blade segment at a blade joint. The second blade segment may include a second outer shell terminating at a second joint end. The outer shells may overlap one another at the blade joint such that an overlapping region is defined between the first and second joint ends. In addition, the first outer shell may be spaced apart from the second outer shell along at least a portion of the overlapping region such that a gap is defined between the outer shells within the overlapping region. Moreover, the rotor blade assembly may include a sealing member positioned between the outer shells within the overlapping region that is configured to allow relative movement between the outer shells at the blade joint.

11 Claims, 7 Drawing Sheets

(52) U.S. Cl.
CPC . *F05B 2240/2211* (2013.01); *F05B 2240/302* (2013.01); *F05B 2240/57* (2013.01); *F05B 2280/4004* (2013.01); *F05B 2280/5001* (2013.01); *Y02E 10/721* (2013.01)

(58) Field of Classification Search
CPC ........... F05B 2280/5001; F03D 1/0675; F03D 1/0683; F03D 1/0633; F03D 1/0641
See application file for complete search history.

(56) References Cited

U.S. PATENT DOCUMENTS

| | | | |
|---|---|---|---|
| 9,297,357 B2* | 3/2016 | Busby | F03D 1/0641 |
| 2005/0013694 A1 | 1/2005 | Kovalsky et al. | |
| 2005/0214122 A1* | 9/2005 | Sorensen | F03D 1/0675 |
| | | | 416/233 |
| 2010/0068058 A1* | 3/2010 | Sorensen | F03D 1/0633 |
| | | | 416/41 |
| 2010/0132884 A1 | 6/2010 | Bachmann et al. | |
| 2011/0243736 A1* | 10/2011 | Bell | F03D 1/0675 |
| | | | 416/132 R |
| 2013/0219718 A1* | 8/2013 | Busbey | F03D 1/065 |
| | | | 29/889.71 |
| 2014/0030093 A1* | 1/2014 | Dahl | F03D 1/0675 |
| | | | 416/95 |
| 2015/0010406 A1 | 1/2015 | Torgard | |
| 2015/0240780 A1 | 8/2015 | Leonard et al. | |
| 2015/0292477 A1 | 10/2015 | Kratmann et al. | |
| 2015/0316026 A1* | 11/2015 | Noronha | F03D 1/0675 |
| | | | 416/226 |

FOREIGN PATENT DOCUMENTS

| | | |
|---|---|---|
| EP | 2252790 B1 | 9/2011 |
| EP | 2288807 B1 | 9/2013 |
| EP | 2902620 A1 | 8/2015 |
| WO | WO 0146582 A2 * | 6/2001 |
| WO | WO2008012615 A2 | 1/2008 |
| WO | WO2013021236 A1 | 2/2013 |
| WO | WO2015067271 A1 | 5/2015 |

* cited by examiner

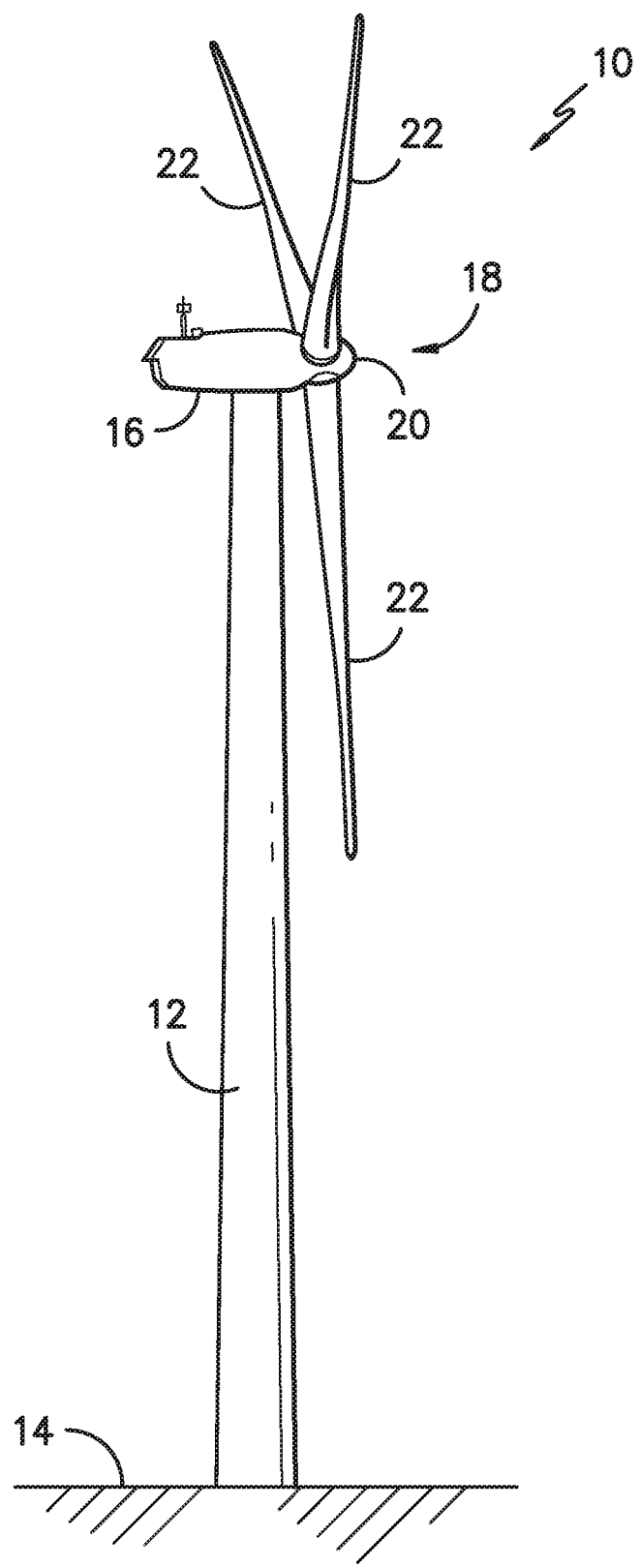
FIG. -1-

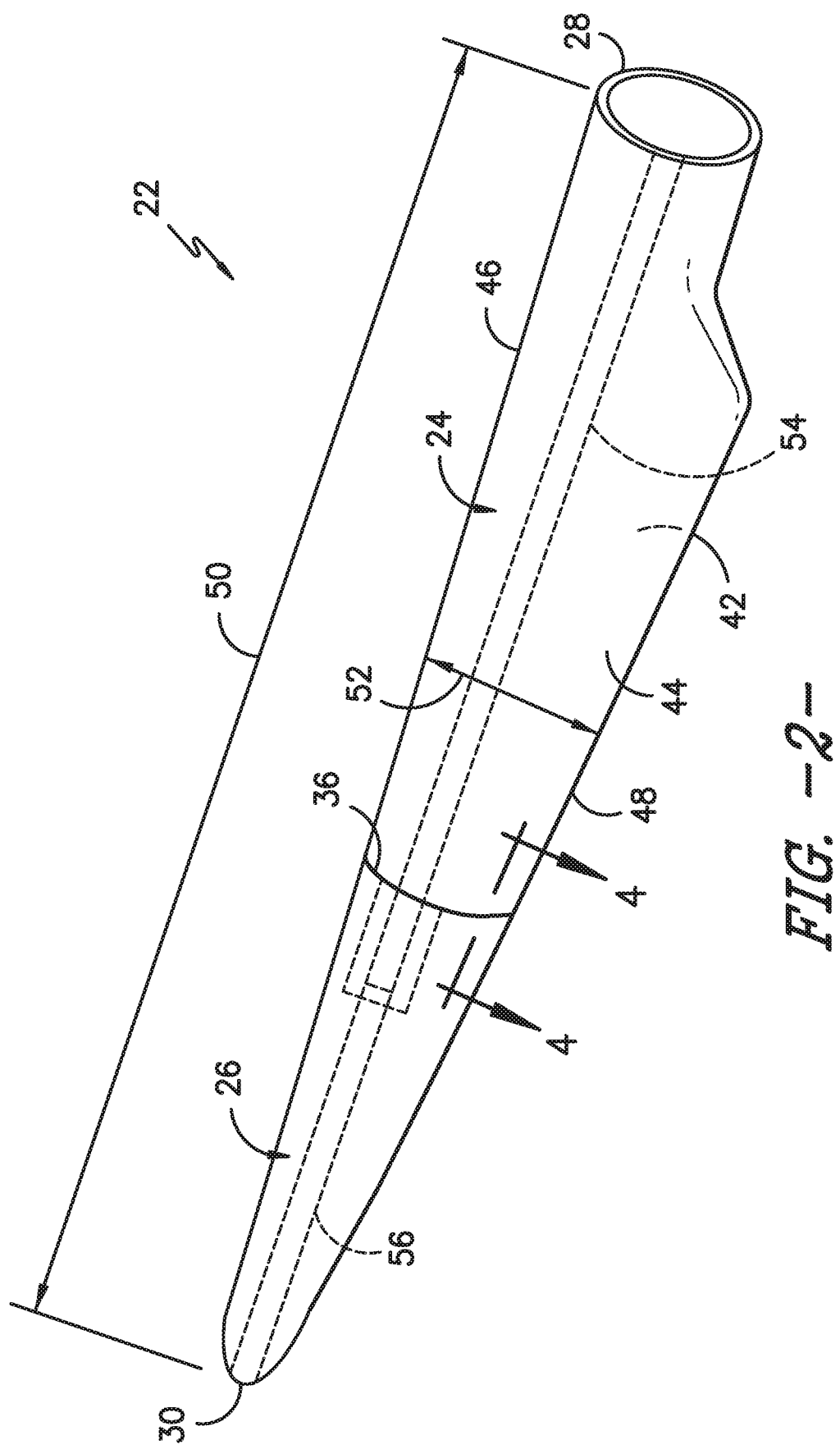
FIG. -2-

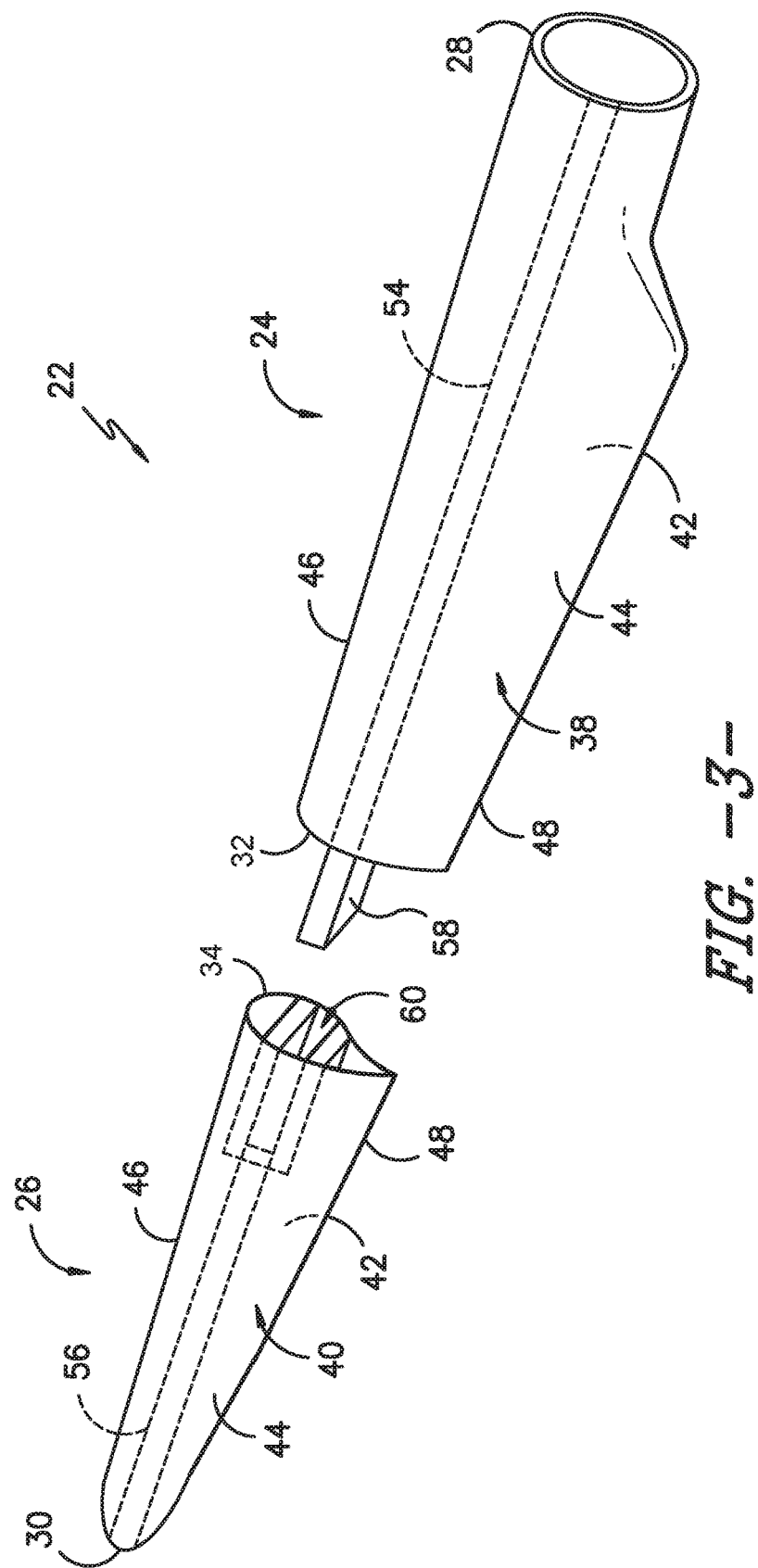
FIG. -3-

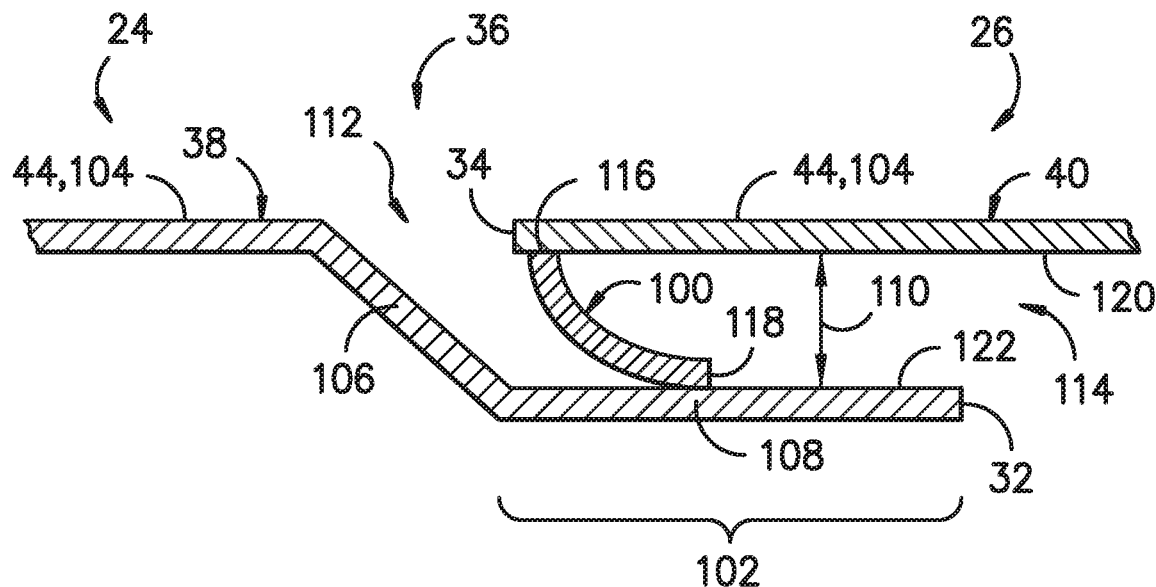
FIG. -4-
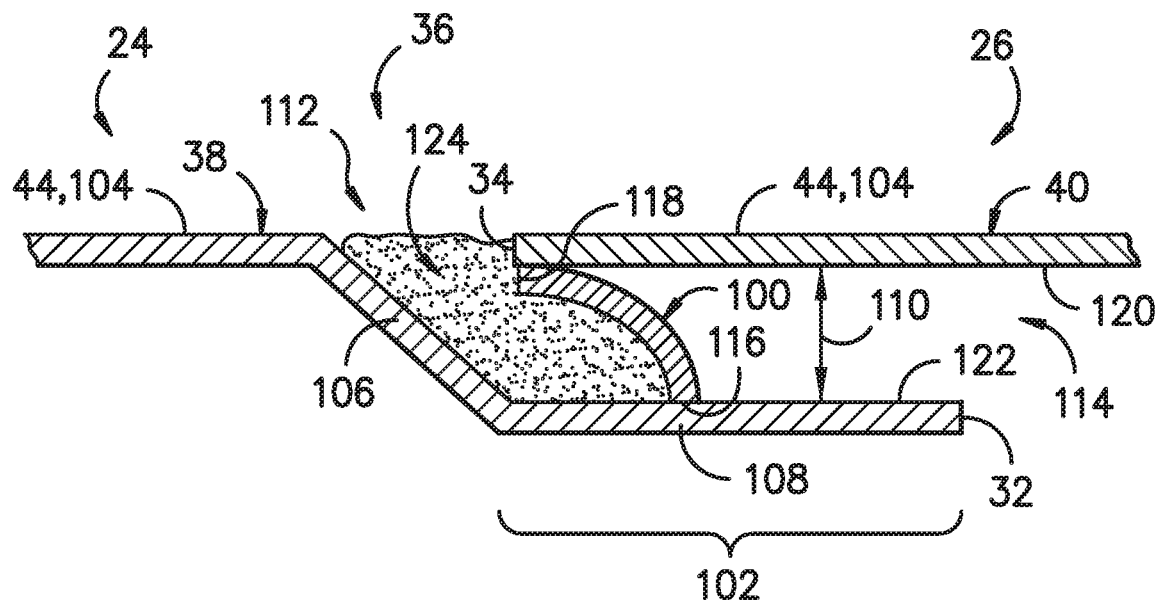
FIG. -5-

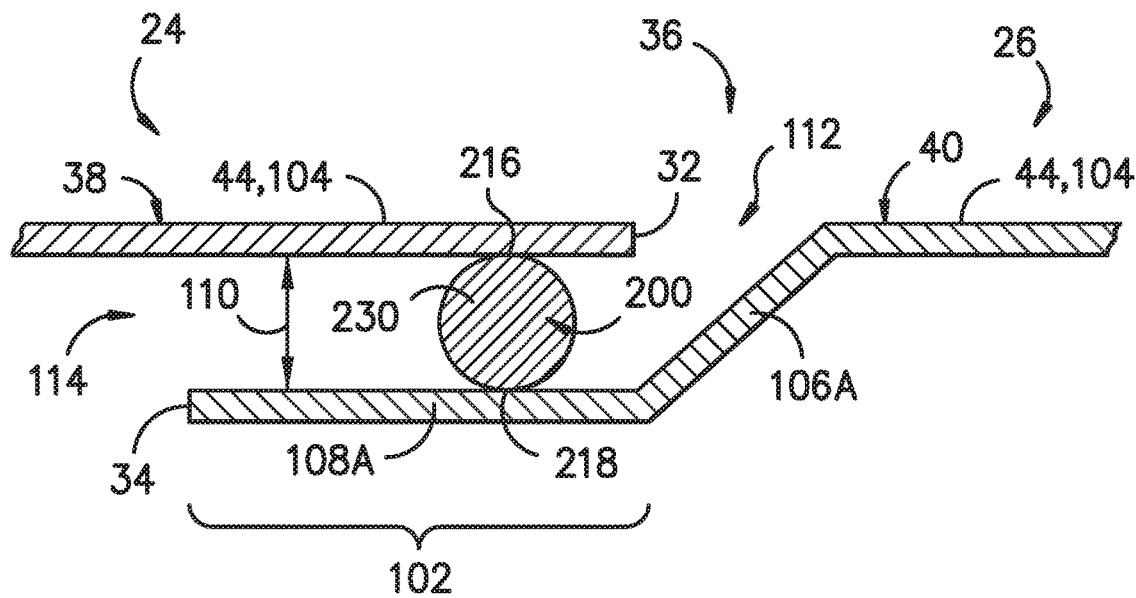
FIG. -6-
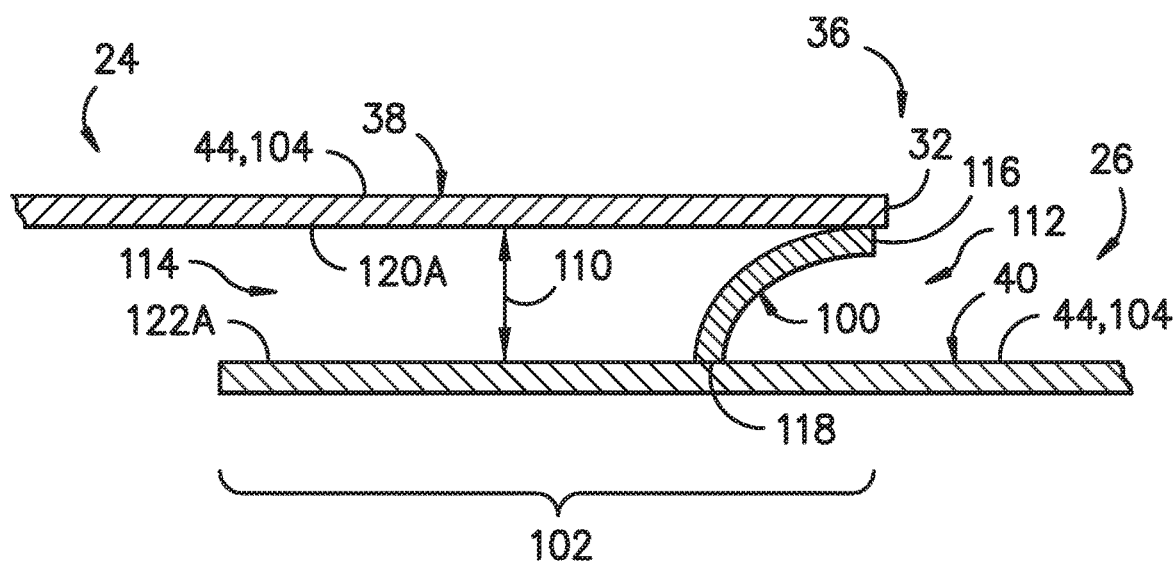
FIG. -7-

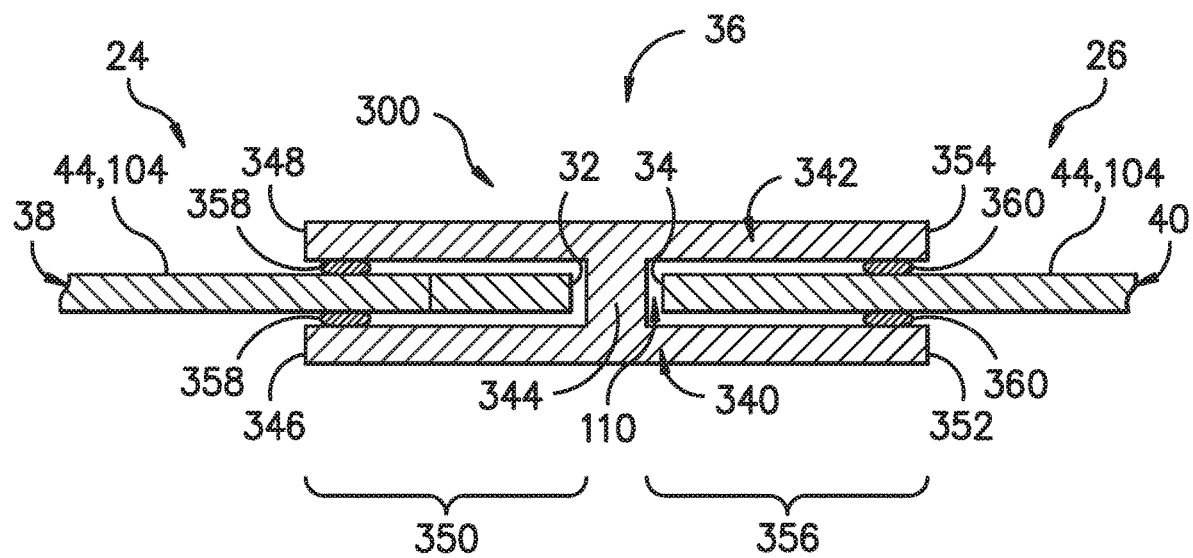
FIG. -8-
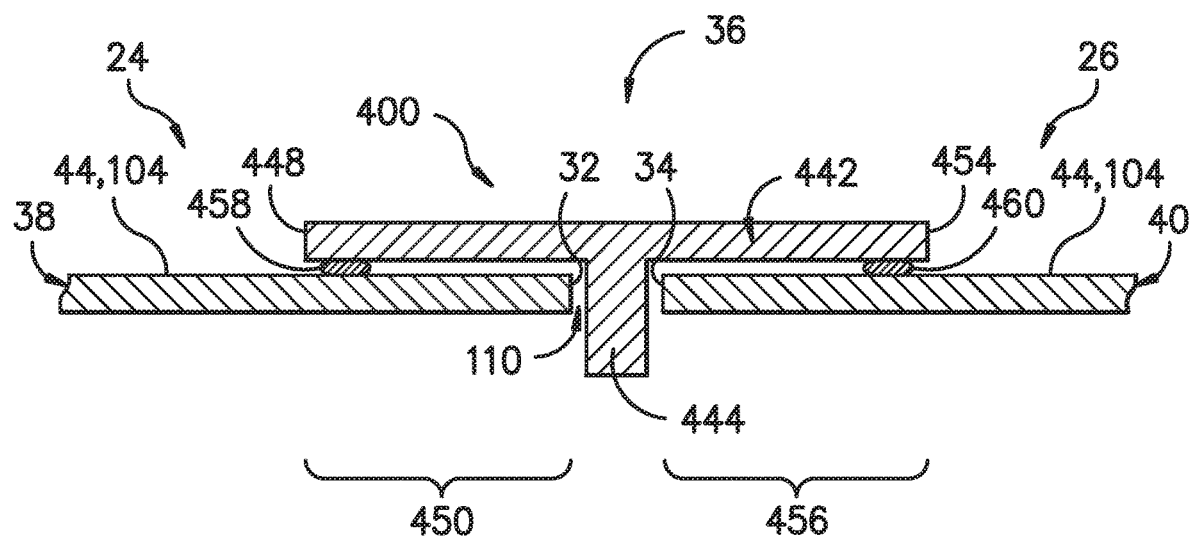
FIG. -9-

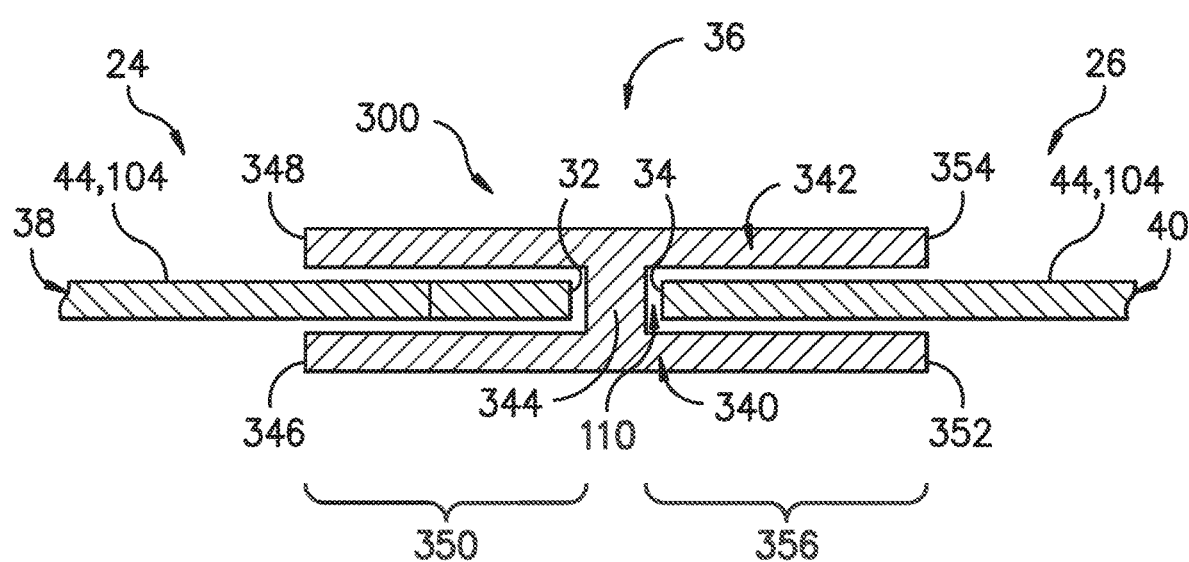
FIG. -10-

SEALING MEMBERS FOR JOINTED ROTOR BLADE ASSEMBLIES

FIELD OF THE INVENTION

The present subject matter relates generally to jointed rotor blade assemblies for wind turbines and, more particularly, to a sealing member(s) that may be installed at a blade joint defined between adjacent blade segments of a jointed rotor blade assembly.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines, such as by increasing the length of the rotor blades. One known strategy for reducing the complexity and costs associated with pre-forming, transporting, and erecting wind turbines having rotor blades of increasing lengths is to manufacture each rotor blade in blade segments. The blade segments may then be assembled to form the rotor blade. However, known joint designs for connecting blade segments together typically have a variety of disadvantages. For example, many known joint designs utilize mechanical fasteners, such as bolts/nuts or pins, to secure blade segments together. However, with such mechanical joints, the jointed rotor blade assembly may often exhibit performance-related issues at the location of the joint, such as increased noise and/or aerodynamic issues.

Accordingly, a sealing member that may be installed at the location of a blade joint defined between adjacent blade segments of a jointed rotor blade assembly to address one or more of the performance-related issues associated with the blade joint would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a jointed rotor blade assembly for a wind turbine. The jointed rotor blade assembly may include a first blade segment having a first outer shell that terminates at a first joint end and a second blade segment coupled to the first blade segment at a blade joint defined between the first and second blade segments. The second blade segment may include a second outer shell that terminates at a second joint end. The first and second outer shells may overlap one another at the blade joint such that an overlapping region is defined between the first and second joint ends. In addition, the first outer shell may be spaced apart from the second outer shell along at least a portion of the overlapping region such that a gap is defined between the first and second outer shells within the overlapping region. Moreover, the jointed rotor blade assembly may include a sealing member positioned between the first and second outer shells within the overlapping region so as to extend across the gap defined between the first and second outer shells. The sealing member may be configured to allow relative movement between the first and second outer shells at the blade joint.

In another aspect, the present subject matter is directed to a jointed rotor blade assembly for a wind turbine. The jointed rotor blade assembly may include a first blade segment having a first outer shell terminating at a first joint end and a second blade segment coupled to the first blade segment at a blade joint defined between the first and second blade segments. The second blade segment may include a second outer shell terminating at a second joint end. The first and second joint ends may be spaced apart from one another such that a gap is defined between the first and second outer shells at the blade joint. In addition, the jointed rotor blade assembly may include a sealing member positioned at least partially between the first and second outer shells. The sealing member may include an outer wall portion extending along an exterior of the jointed rotor blade assembly and a joint wall portion extending from the outer wall portion through the gap defined between the first and second outer shells.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective view of one embodiment of a jointed rotor blade assembly suitable for use with the wind turbine shown in FIG. 1 in accordance with aspects of the present subject matter;

FIG. 3 illustrates an exploded view of the jointed rotor blade assembly shown in FIG. 2, particularly illustrating a first blade segment of the rotor blade assembly exploded away from a second blade segment of the rotor blade assembly;

FIG. 4 illustrates a partial, cross-sectional view of an example blade joint that may be formed between the first and second blade segments of the rotor blade assembly shown in FIG. 2 taken about line 4-4 in accordance with aspects of the present subject matter, particularly illustrating one embodiment of a sealing member that may be installed at the joint interface defined between the outer shells of the blade segments;

FIG. 5 illustrates a partial, cross-sectional view of another embodiment of a configuration for a joint interface that may defined between the outer shells of the blade segments of the disclosed rotor blade assembly in accordance with aspects of the present subject matter, particularly illustrating a sealant material positioned within the gap defined between the outer shells at a location adjacent to a corresponding sealing member;

FIG. 6 illustrates a partial, cross-sectional view of a further embodiment of a sealing member that may be installed at a joint interface defined between the outer shells of the blade segments of the disclosed rotor blade assembly in accordance with aspects of the present subject matter;

FIG. 7 illustrates a partial, cross-sectional view of yet another embodiment of a configuration for a joint interface that may be defined between the outer shells of the blade segments of the disclosed rotor blade assembly in accordance with aspects of the present subject matter, particularly illustrating a sealing member installed at the joint interface defined between the outer shells;

FIG. 8 illustrates a partial, cross-sectional view of an even further embodiment of a sealing member that may be installed at a joint interface defined between the outer shells of the blade segments of the disclosed rotor blade assembly in accordance with aspects of the present subject matter;

FIG. 9 illustrates a partial, cross-sectional view of another embodiment of a sealing member that may be installed at a joint interface defined between the outer shells of the blade segments of the disclosed rotor blade assembly in accordance with aspects of the present subject matter; and FIG. 10 illustrates a partial, cross-sectional view of an additional embodiment of a sealing member that may be installed at a joint interface defined between the outer shells of the blade segments of the disclosed rotor blade assembly in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a sealing member configured to be installed at the blade joint defined between adjacent blade segments of a jointed rotor blade assembly. Specifically, in several embodiments, the joint interface defined between the blade segments at the blade joint may be configured such that, when the blade segments are coupled to one another, a gap is defined between the outer shells of the blade segments. In such embodiments, the disclosed sealing member(s) may be installed between the blade segments to at least partially seal the gap defined between the outer shells, thereby mitigating one or more of the performance-related issues associated with the blade joint, such as by reducing the amount of noise generated by the rotor blade assembly at the blade joint and/or by increasing the aerodynamic performance of the rotor blade assembly at the location of the gap and/or at the areas immediately surrounding the gap. In addition, the disclosed sealing member(s) may also be configured to allow relative movement between the outer shells of the adjacent blade segments. As such, the sealing member may allow the rotor blade assembly to accommodate bending, twisting and/or other relative deflections of the blade segments at the location of the blade joint.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade assembly 22 coupled to and extending outwardly from the hub 20. For example, in the illustrated embodiment, the rotor 18 includes three rotor blade assemblies 22. However, in an alternative embodiment, the rotor 18 may include more or less than three rotor blade assemblies 22. Each rotor blade assembly 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2 and 3, one embodiment of a jointed rotor blade assembly 22 suitable for use with the wind turbine 10 shown in FIG. 1 is illustrated in accordance with aspects of the present subject matter. Specifically, FIG. 2 illustrates a perspective, assembled view of the rotor blade assembly 22 and FIG. 3 illustrates a perspective, exploded view of the rotor blade assembly 22.

As shown, the rotor blade assembly 22 may generally be formed from a plurality of spanwise blade segments 24, 26 configured to be coupled end-to-end such that the rotor blade assembly 22 extends between a blade root 28 configured to be mounted or otherwise secured to the hub 20 (FIG. 1) of the wind turbine 10 and a blade tip 30 disposed opposite the blade root 28. For example, in the illustrated embodiment, the rotor blade assembly 22 is formed from two blade segments 24, 26, namely a first blade segment 24 (e.g., a root segment) and a second blade segment 26 (e.g., a tip segment). As particularly shown in FIG. 3, the first blade segment 24 may generally extend lengthwise between the blade root 28 and a first joint end 32. Similarly, the second blade segment 26 may generally extend lengthwise between the blade tip 30 and a second joint end 34. In such an embodiment, the first and second blade segments 24, 26 may generally be configured to be coupled to one another at their joint ends 32, 34. For example, as shown in FIG. 2, when the blade segments 24, 26 are coupled together at their joint ends 32, 34, a blade joint 36 may be defined at the joint interface between the two segments 24, 26.

It should be appreciated that, in other embodiments, the rotor blade assembly 22 may be formed from any other suitable number of spanwise blade segments. For instance, the rotor blade assembly 22 may be formed from three blade segments or more than three blade segments, such as four blade segments, five blade segments, or more than five blade segments.

In general, each blade segment 24, 26 may include an outer shell 38, 40 configured to extend between the opposed ends of such segment that generally serves as the outer casing/covering of the blade segment 24, 26. For instance, the first blade segment 24 may include a first outer shell 38 (FIG. 3) extending lengthwise between the blade root 28 and the first joint end 32. Similarly, the second blade segment 26 may include a second outer shell 40 (FIG. 3) extending lengthwise between the second joint end 34 and the blade tip 30. Each of the outer shells 38, 40 may generally be configured to define spanwise portions of the aerodynamic profile of the rotor blade 22. As such, the outer shells 38, 40 may collectively define a pressure side 42 and a suction side 44 of the rotor blade assembly 22, with the pressure and suction sides 42, 44 extending between leading and trailing edges 46, 48 of the rotor blade assembly 22.

It should be appreciated that the blade segments 24, 26 included within the rotor blade assembly 22 may be configured to form any suitable portion or section of the overall rotor blade, such as by configuring the blade segments 24, 26 as shown in FIGS. 2 and 3 to form full spanwise sections of the blade (e.g., by having outer shells 38, 40 that define both the pressure and suction sides 42, 44 of the blade). Alternatively, the blade segments including within the rotor blade assembly 22 may only be configured to form partial spanwise sections of the overall rotor blade, such as by configuring the blade segments as pressure side and/or suction side panels or by configuring the blade segments as leading edge and/or trailing edge panels.

As shown in FIG. 2, when assembled, the rotor blade assembly 22 may also have a span 50 defining the total length between the blade root 28 and the blade tip 30. In addition, the rotor blade assembly 22 may define a chord 52 corresponding to the total length of the blade between its leading and trailing edges 46, 48. As is generally understood, the chord 52 may generally vary in length with respect to the span 50 as the rotor blade assembly 22 extends from the blade root 28 to the blade tip 30.

It should be appreciated that, in several embodiments, the outer shells 38, 40 of the blade segments 24, 26 may be formed from one or more shell components. For instance, in one embodiment, each outer shell 38, 40 may be formed form a pressure side shell (not shown) forming a portion of the pressure side 42 of the rotor blade assembly 22 and a suction side shell (not shown) forming a portion of the suction side 44 of the rotor blade assembly 22. In addition, the outer shells 28, 30 may generally be formed from any suitable material. For instance, in several embodiments, each outer shell 38, 40 may be formed from a fiber-reinforced composite, such as a fiber reinforced laminate including a plurality of fibers (e.g., glass or carbon fibers) surrounded by a suitable matrix material (e.g., a thermoset resin material or a thermoplastic resin material). In addition, one or more portions of each outer shell 38, 40 may be configured as a layered construction and may include a core material, formed from a lightweight material such as wood (e.g., balsa), foam (e.g., extruded polystyrene foam) or a combination of such materials, disposed between layers of laminate composite material.

Additionally, in several embodiments, each outer shell 38, 40 may also include one or more internal structural components contained therein configured to provide increased stiffness, buckling resistance and/or strength to the rotor blade assembly 22. For example, as shown in FIGS. 2 and 3, the first blade segment 24 may include one or more internal structural components 54 extending within the first outer shell 38, such as by including one or more longitudinally extending structural components (e.g., a pair of opposed spar caps having a shear web extending therebetween) positioned within the first outer shell 38. Similarly, as shown in FIGS. 2 and 3, the second blade segment 26 may include one or more internal structural components 56 extending within the second outer shell 40, such as by including one or more longitudinally extending structural components (e.g., a pair of opposed spar caps having a shear web extending therebetween) positioned within the second outer shell 40.

It should be appreciated that the first and second blade segments 24, 26 may generally be configured to be coupled to one another using any suitable means known in the art. In several embodiments, one or more of the internal structural components 54 of the first blade segment 24 may be configured to be coupled to one or more of the internal structural components 56 of the second blade segment 25 at a location at or adjacent to the blade joint 36. For example, in one embodiment, the internal structural component(s) 54, 56 of one or both of the blade segments 24, 26 may be configured to extend in the spanwise direction beyond the joint end 32, 34 of the outer shell 38, 40 of such blade segment(s) 24, 26 to allow the internal structural component(s) 54, 56 to be received within the adjacent blade segment 24, 26. In such an embodiment, the internal structural components 54, 56 of the blade segments 24, 26 may be secured to one another at or adjacent to the blade joint 36 to allow the first blade segment 24 to be coupled to the second blade segment 26.

As shown in FIG. 3, in one embodiment, the internal structural component(s) 54 of the first blade segment 24 may include an extended portion 58 that extends outwardly from the first joint end 32 of the first outer shell 38. Additionally, as shown in the illustrated embodiment, the internal structural component(s) 56 of the second blade segment 26 may be configured to at least partially define a cavity 60 for receiving the extended portion 58 of the internal structural component(s) 54 of the first blade segment 24, such as by configuring the internal structural component(s) 56 of the second blade segment 26 to form a rectangular or "box-shaped" profile within the interior of the second blade segment 26. In such an embodiment, when the extended portion 58 of the internal structural component(s) 54 of the first blade segment 24 is received within the cavity 60 defined by the internal structural component(s) 54 of the second blade segment 26, the internal structural components 54, 56 of the blade segments 24, 26 may be secured to one another (e.g., via a suitable adhesive(s) or mechanical fasteners) to allow the blade segments 24, 26 to be coupled together.

Referring now to FIG. 4, a partial cross-sectional view of the blade joint 36 formed between the first and second blade segments 24, 26 of the rotor blade assembly 22 shown in FIG. 2 taken about line 4-4 is illustrated in accordance with aspects of the present subject matter, particularly illustrating one embodiment of a sealing member 100 that may be installed at the joint interface defined between the outer shells 38, 40 of the blade segments 24, 26 along the blade joint 36. For purposes of description, FIG. 4 simply illustrates the sealing member 100 as installed between adjacent portions of the first and second outer shells 38, 40 at a location along the suction side 44 of the rotor blade assembly 22. However, it should be appreciated that the sealing member 100 shown in FIG. 4 may extend around the entire outer perimeter of the blade joint 36 defined between the blade segments 24, 26 of the disclosed rotor blade assembly 22. For example, the configuration of the illustrated joint interface may extend chordwise along the both the pressure side 42 and the suction side 44 of the rotor blade assembly 22.

As shown in FIG. 4, in several embodiments, the first and second outer shells 38, 40 may be configured to overlap one another at the location of the blade joint 36 defined between the blade segments 24, 26. Specifically, as shown, the outer shells 38, 40 may be configured to overlap one another such that an overlapping region 100 is defined between the joint ends 32, 34 of the outer shells 38, 40. In several embodiments, the overlapping region 102 may be defined by a section of one of the outer shells 38, 40 that is recessed relative to an exterior surface 104 of the rotor blade assembly 22. For example, as shown in the illustrated embodiment, a wall portion 106 of the first outer shell 38 may be configured to extend inwardly from the exterior surface 104 of the rotor blade assembly 22 such that a recessed section 108 of the first outer shell 38 (e.g., extending between the wall portion 106 and the joint end 32 of the outer shell 38) is received within a portion of the second outer shell 40, thereby defining the overlapped region 102. In such an embodiment, the exterior surface 104 of the rotor blade assembly 22 may generally define a substantially flat or planar profile at the location of the blade joint 36. It should be appreciated that, in other embodiments, a section of the second outer shell 40 may be configured to be recessed inwardly relative to the first outer shell 38 to define the overlapping region 102 between the outer shells 38, 40 (e.g., as shown in FIG. 6).

In several embodiments, the first and second outer shells 38, 40 may be configured to be spaced apart from one another along at least a portion of the overlapping region 102. For example, as shown in FIG. 4, the outer shells 38, 40 are spaced apart from one another such that a gap 110 is defined between the outer shells 38, 40 that extends along the entire length of the overlapping region 102. Specifically, in several embodiments, the gap 110 may extend between an outer end 112 terminating at the exterior surface 104 of the rotor blade assembly 22 and an inner end 114 terminating within the interior of the rotor blade assembly 22. As such, the outer end 112 of the gap 110 may form a discontinuity in the exterior surface 104 of the rotor blade assembly 22.

As indicated above, in several embodiments, a sealing member 100 may be configured to be installed between the first and second outer shells 38, 40 within the overlapping region 102. Specifically, as shown in FIG. 4, the sealing member 100 may be configured to extend across the gap 110 defined between the outer shells 38, 40 at a location within the overlapping region 102 such that the sealing member 100 at least partially seals the gap 110. As such, the sealing member 100 may serve to reduce or mitigate any performance-related issues that may otherwise be associated with the gap 110 defined between the outer shells 38, 40 at the blade joint 36.

Additionally, in several embodiments, the sealing member 100 may be configured to allow the first and second outer shells 38, 40 to move relative to one another at the location of the blade joint 36. Specifically, in one embodiment, the sealing member 100 may be configured to at least partially seal the gap 110 defined between the outer shells 38, 40 without providing a rigid connection between the blade segments 24, 26. As such, during operation of the associated wind turbine 10, the sealing member 100 may allow for relative motion between the outer shells 38, 40 to accommodate bending, twisting and/or other deflections of the rotor blade assembly 22 at the location of the blade joint 36.

As shown in FIG. 4, in several embodiments, the sealing member 100 may be configured to extend lengthwise across the gap 110 between a first end 116 and a second end 118. In one embodiment, the first end 116 may be configured to be fixedly coupled to one of the first outer shell 38 or the second outer shell 40 while the second end 116 may be configured to be movable or slidable relative to the other of the first outer shell 38 or the second outer shell 40. For example, as shown in FIG. 4, the first end 116 may be fixedly coupled to an inner surface 120 of the second outer shell 40 while the second end 118 may be configured to positioned adjacent to an outer surface 122 of the first outer shell 38 to allow the second end 118 of the sealing member 100 to slide relative to such outer surface 122 to accommodate relative motion between the outer shells 38, 40.

It should be appreciated that the first end 116 of the sealing member 100 may be configured to be fixedly coupled to the adjacent surface 120 of the second outer shell 40 using any suitable means known in the art that allows the first end 116 to be maintained at its position relative to the second outer shell 40. For instance, in one embodiment, the first end 116 of the sealing member 100 may be fixedly coupled to the second outer shell 40 using mechanical fasteners and/or a suitable adhesive(s). In another embodiment, the first end 116 of the sealing member 100 may be configured to be thermoplastically welded to the second outer shell 40. For example, the sealing member 100 may be at least partially formed from a thermoplastic resin. In such an embodiment, the thermoplastic resin located at the first end 116 of the sealing member 100 may be welded to one or more layers of thermoplastic resin positioned at the inner surface 120 of the second outer shell 40 (e.g., by locally heating the resins to weld the adjacent components together).

Additionally, as shown in FIG. 4, in one embodiment, the sealing member 100 may be configured to define a curved or arcuate profile between its first and second ends 116, 118. Such a curved profile may allow for the portion of the sealing member 100 positioned at or adjacent to its second end 118 to be maintained in contact with the first outer shell 38 in the event that the outer shells 38, 40 move relative to one another. For instance, the sealing member 100 may be configured to be in compression between the outer shells 38, 40 in a steady state of the rotor blade assembly 22 such that the sealing member 100 is compressed against the first outer shell 38 at or adjacent to its second end 118, thereby providing a suitable sealing interface between the sealing member 100 and the first outer shell 38. In such an embodiment, when the outer shells 38, 40 move relative to one another, the second end 118 of the sealing member 100 may slide along the outer surface 122 of the first outer shell 38 to maintain the sealing interface between such adjacent components.

It should be appreciated that the sealing member 100 may generally be formed from any suitable material. However, in one embodiment, the sealing member may be formed from a plastic material, such as an unreinforced plastic material or a reinforced plastic material (e.g., a fiber-reinforced composite).

Referring now to FIG. 5, a variation of the embodiment of the configuration of the joint interface shown in FIG. 4 is illustrated in accordance with aspects of the present subject matter. As shown in FIG. 5, unlike the embodiment described above, the first end 116 of the sealing member 100 is fixedly coupled to the outer surface 122 of the first outer shell 38 while the second end 118 is configured to be movable or slidable relative to the inner surface 120 of the second outer shell 40. As such, with relative movement between the outer shells 38, 40, the second end 118 of the sealing member 100 may slide along the inner surface 120 of the second outer shell 40 to maintain the sealing interface between the sealing member 100 and the second outer shell 40.

Moreover, in addition to the sealing member 100, a sealing material 124 may be positioned within the gap 110 defined between the outer shells 38, 40 such that the sealing material 124 substantially fills at least a portion of the gap 110. Specifically, as shown in the illustrated embodiment, the sealant material 124 may be configured to substantially fill the portion of the gap 110 extending between the sealing member 100 and the exterior surface 104 of the rotor blade assembly 22 (e.g., to the outer end 112 of the gap 110). As such, the sealant material 124 may provide an additional means for sealing the gap 110 between the outer shells 38, 40 of the adjacent blade segments 24, 26.

It should be appreciated that, in several embodiments, the sealant material 124 may correspond to a material having a substantially low stiffness so as to maintain the ability of the outer shells 38, 40 to move relative to one another at the location of the blade joint 36. For instance, the sealant material 124 may correspond to a caulking material or other suitable elastomeric material that is configured to allow relative movement between the adjacent sections of the outer shells 38, 40 positioned at the blade joint 36.

Referring now to FIG. 6, a partial, cross-sectional view of another embodiment of a joint interface that may be formed at the blade joint 36 defined between the outer shells 38, 40 of the blade segments 24, 26 of the disclosed rotor blade assembly 22 is illustrated in accordance with aspects of the present subject matter, particularly illustrating another embodiment of a sealing member 200 that may be installed at such joint interface. Similar to the embodiments described above with reference to FIGS. 4 and 5, FIG. 6 simply illustrates the sealing member 200 as installed between adjacent portions of the first and second outer shells 38, 40 at a location along the suction side 44 of the rotor blade assembly 22. However, it should be appreciated that the sealing member 200 shown in FIG. 6 may extend around the entire outer perimeter of the blade joint 36 defined between the blade segments 24, 26 of the disclosed rotor blade assembly 22.

As shown in FIG. 6, unlike the embodiments described above with reference to FIGS. 4 and 5, a section of the second outer shell 40 is recessed relative to the first outer shell 38 so as to define the overlapping region 102 between the outer shells 38, 40. Specifically, in the illustrated embodiment, a wall portion 106A of the second outer shell 40 may be configured to extend inwardly from the exterior surface 104 of the rotor blade assembly 22 such that a recessed section 108A of the second outer shell 40 (e.g., extending between the wall portion 106A and the joint end 34 of the outer shell 40) is received within a portion of the first outer shell 38, thereby defining the overlapped region 102. As such, the exterior surface 104 of the rotor blade assembly 22 may generally define a substantially flat or planar profile at the location of the blade joint 22.

Additionally, as shown in FIG. 6, in several embodiments, a sealing member 200 may be configured to be positioned between the first and second shells 38, 40 within the overlapping region 102. Similar to the sealing member 100 described above with reference to FIGS. 4 and 5, the sealing member 200 may be configured to extend across the gap 110 defined between the outer shells 38, 40 at a location within the overlapping region 102 such that the sealing member 200 at least partially seals the gap 100. As such, the sealing member 200 may serve to reduce or mitigate any performance-related issues that may otherwise be associated with the gap 110 defined between the outer shells 38, 40 at the blade joint 36. In addition, the sealing member 200 may be configured to allow the outer shells 38, 40 to move relative to one another at the location of the blade joint 36. For instance, the sealing member 200 may be configured to at least partially seal the gap 110 without providing a rigid connection between the outer shells 38, 40. Thus, the sealing member 200 may allow for relative motion between the outer shells 38, 40 to accommodate bending, twisting and/or other deflections of the rotor blade assembly 22 at the location of the blade joint 36.

In several embodiments, the sealing member 200 may be configured similar to a gasket seal or other suitable compressible seal. For example, the sealing member 200 may be formed from an elastic material 230 that is configured to compress and/or expand with movement of the first and second blade segments 24, 26 to allow the outer shells 38, 40 to move relative to one another at the blade joint 36. As shown in FIG. 4, the sealing member 200 may configured to extend across the gap between a first end 216 and a second end 218, with the first end 216 contacting and/or being coupled to the first outer shell 38 and the second end 218 contacting or being coupled to the second outer shell 40. In such an embodiment, the elastic material 230 of the sealing member 200 may be configured to expand and/or compress between the first and second ends 216, 218 of the sealing member 200 as the outer shells 38, 40 move relative to one another.

It should be appreciated that the elastic material 230 used to form the sealing member 200 may generally correspond to any suitable elastic material. However, in a particular embodiment of the present subject matter, the elastic material 230 may correspond to a rubber material.

Referring now to FIG. 7, a partial, cross-sectional view of a further embodiment of a joint interface that may be formed at the blade joint 36 defined between the outer shells 38, 40 of the blade segments 24, 26 of the disclosed rotor blade assembly 22 is illustrated in accordance with aspects of the present subject matter. Similar to the embodiments described above with reference to FIGS. 4-6, FIG. 7 simply illustrates the joint interface defined between adjacent portions of the first and second outer shells 38, 40 at a location along the suction side 44 of the rotor blade assembly 22. However, it should be appreciated that the configuration of the joint interface shown in FIG. 7 may extend around the entire outer perimeter of the blade joint 36 defined between the blade segments 24, 26 of the disclosed rotor blade assembly 22.

As shown in FIG. 7, unlike the embodiments described above with reference to FIGS. 4-6, the overlapping region 102 may be defined between the first and second outer shells 38, 40 without requiring one of the outer shells 38, 40 to include a recessed section that is spaced inwardly from the remainder of such outer shell 38, 40. Rather, as shown in FIG. 7, the outer shells 38, 40 may be offset from one another such that the exterior surface 104 of the rotor blade assembly 22 defines a stepped profile at the location of the blade joint 36. For instance, as shown in the illustrated embodiment, the second outer shell 40 may be dimensionally smaller than the first outer shell 38 such that a portion of the second outer shell 40 is received within a portion of the first outer shell 38, thereby defining the overlapping region 102. However, in an alternative embodiment, the first outer shell 38 may be dimensionally smaller than the second outer shell 40 such that a portion of the first outer shell 38 is received within a portion of the second outer shell 40. In either embodiment, the outer shells 38, 40 may be spaced apart from one another along the overlapping region 102 so that a gap 110 is defined between the outer shells 38, 40 that extends between an outer end 112 and an inner end 114 at the location of the blade joint 36.

Additionally, as shown in FIG. 7, a sealing member 100 may be configured to be positioned between the outer shells 38, 40 within the overlapping region 102. In the illustrated embodiment, the sealing member 100 is configured similar to the sealing members 100 described above with reference to FIGS. 4 and 5. For instance, the sealing member 100 may be configured to define a curved or arcuate profile extending lengthwise across the gap 110 between a first end 116 and a second end 118, with the first end 116 being configured to be fixedly coupled to one of the first outer shell 38 or the second outer shell 40 and the second end 118 being configured to be movable or slidable relative to the other of the first outer shell 38 or the second outer shell 40. For example, in the illustrated embodiment, the first end 116 is fixedly coupled to an outer surface 122A of the second outer shell 40 while the second end 118 may be configured to positioned adjacent to an inner surface 120A of the first outer shell 38 to allow the second end 118 of the sealing member 100 to slide relative to such inner surface 120A when the outer shells 38, 40 move relative to one another. However, it should be appreciated that, in other embodiments, any other suitable sealing member or device may be installed within the gap 110 defined between the outer shells 38, 40 as shown in FIG. 7, such as the sealing member 200 described above with reference to FIG. 6.

Referring now to FIG. 8, a partial, cross-sectional view of yet another embodiment of a joint interface that may be formed at the blade joint 36 defined between the outer shells 38, 40 of the blade segments 24, 26 of the disclosed rotor blade assembly 22 is illustrated in accordance with aspects of the present subject matter, particularly illustrating another embodiment of a sealing member 300 that may be installed at such joint interface. Similar to the embodiments described above with reference to FIGS. 4-7, FIG. 8 simply illustrates the sealing member 300 as installed between adjacent portions of the first and second outer shells 38, 40 at a location along the suction side 44 of the rotor blade assembly 22. However, it should be appreciated that the sealing member 300 shown in FIG. 8 may extend around the entire outer perimeter of the blade joint 36 defined between the blade segments 24, 26 of the disclosed rotor blade assembly 22.

As shown in FIG. 8, unlike the embodiments described above with reference to FIGS. 4-7, the first and second outer shells 38, 40 may not be configured to overlap one another at the location of the blade joint 36. Rather, the joint ends 32, 34 of the outer shells 38, 40 may be aligned with one another, with the outer shells 38, 40 terminating end-to-end at a location at or adjacent to the blade joint 36. In such an embodiment, the joint ends 32, 34 of the outer shells 348, 40 may be spaced apart from one another so that a gap 110 is defined between the outer shells 38, 40. As shown in FIG. 8, the gap 110 may generally form a discontinuity in the exterior surface 104 of the rotor blade assembly 22.

Additionally, as shown in FIG. 8, in several embodiments, a sealing member 300 may be configured to be positioned at the interface defined between the outer shells 38, 40 at the location of the blade joint 36. Specifically, the sealing member 300 may be configured to extend across and/or cover the gap 110 defined between the outer shells 38, 40, thereby reducing or mitigating any performance-related issues that may otherwise be associated with having the gap 110 defined along the exterior surface 104 of the rotor blade assembly 22. In addition, the sealing member 300 may also be configured to allow the outer shells 38, 40 to move relative to one another at the location of the blade joint 36. Specifically, the sealing member 300 may be configured to be installed relative to the blade segments 24, 26 without providing a rigid connection between the outer shells 38, 40. As such, during operation of the associated wind turbine 10, the sealing member 300 may allow relative motion between the outer shells 38, 40 to accommodate bending, twisting and/or other deflections of the rotor blade assembly 22 at the location of the blade joint 36.

As shown in FIG. 8, the sealing member 300 may, in one embodiment, have an "H-shaped" cross-section. Specifically, the sealing member 300 may include an inner wall portion 340 extending along the interior of the rotor blade assembly 22, an outer wall portion 342 extending along the exterior of the rotor blade assembly 22 and a joint wall portion 344 extending directly between the inner and outer wall portions 340, 342. As shown in the illustrated embodiment, both the inner wall portion 340 and the outer wall portion 342 may be configured to extend outwardly from the opposed ends of the joint wall portion 344 such that the inner and outer wall portions 340, 342 overlap sections of the outer shells 38, 40 along opposed side of the blade joint 36. Specifically, sections of the inner and outer walls portions 340, 342 may be configured to extend outwardly from the joint wall portion 344 in the direction of the first blade segment 24 towards a first end 346, 348 of each wall portion 340, 342, respectively, such that the wall portions 340, 32 overlap the first outer shell 38 along a first overlapping region 350 defined along a first side of the blade joint 36 between the joint wall portion 344 and the first ends 346, 348 of the inner and outer wall portions 340, 342. Similarly, differing sections of the inner and outer wall portions 340, 342 may be configured to extend outwardly from the joint wall portion 344 in the direction of the second blade segment 26 towards a second end 352, 354 of each wall portion 340, 342, respectively, such that the wall portions 340, 342 overlap the second outer shell 40 along a second overlapping region 356 defined along a second side of the blade joint 36 between the joint wall portion 344 and the second ends 352, 354 of the inner and outer wall portions 340, 342.

Additionally, as shown in FIG. 8, the joint wall portion 344 may generally be configured to extend through the gap 110 defined between the outer shells 38, 40 to provide a connection between the inner wall portion 340 positioned within the interior of the rotor blade assembly 22 and the outer wall portion 342 positioned along the exterior of the rotor blade assembly 22. For example, in one embodiment, the joint wall portion 344 may be configured to extend substantially perpendicularly between the inner and outer wall portions 340, 342. Additionally, in one embodiment, the joint wall portion 344 may extend between the inner and outer wall portions 340, 342 at a substantially central location defined between the opposed ends 346, 348, 352, 354 of the inner and outer wall portions 340, 342. In such an embodiment, each of the inner and outer wall portions 340, 342 may generally be configured to extend outwardly from the joint wall portion 344 the same or substantially the same distance along both sides of the blade joint 36.

In several embodiments, the sealing member 300 may be formed from a material having a relatively low stiffness as compared to the stiffness of the outer shells 38, 40. As such, the sealing member 300 may be configured to flex or deform to accommodate relative motion of the outer shells 38, 40. For example, in one embodiment, the sealing member 300 may be formed from an elastic material, such as a rubber material, or any other suitable low-stiffness, flexible material.

Additionally, in one embodiment, both the inner wall portion 340 and the outer wall portion 342 may be configured to be coupled to the adjacent surfaces of the outer shells 38, 40 at one or more locations along both sides of the blade joint 36. For example, as shown in FIG. 8, the inner and outer wall portions 340, 342 may be coupled to the first outer shell 38 at corresponding attachment locations 358 defined between the wall portions 340, 342 and the adjacent surfaces the first outer shell 38. Similarly, the inner and outer wall portions 340, 342 may be coupled to the second outer shell 40 at corresponding attachment locations 360 defined between the wall portions 340, 342 and the adjacent surfaces the second outer shell 40. In such an embodiment, the inner and outer wall portions 340, 342 may be coupled to the outer shells at the attachment locations 358, 360 using any suitable means, such as by using mechanical fasteners or an adhesive(s) or by welding the components together (e.g., via thermoplastic welding). Alternatively, the inner and outer wall portions 340, 342 may be only configured to be coupled to the adjacent surfaces of the outer shells 38, 40 at one or more locations along one of the sides of the blade joint 36, such as by only coupling the upper and lower wall portions 340, 342 to the first outer shell 38 (e.g., at attachment locations 358) or by only coupling the upper and lower portions 340, 342 to the second outer shell 40 (e.g., at attachment locations 360). In another embodiment, as shown in FIG. 10, the sealing member 300 may be installed between the blade segments 24, 25 without coupling the upper and lower portions 340, 342 to the outer shells 38, 40. In such an embodiment, the sealing member 300 may simply be retained in position due to its "H-shaped" configuration.

Referring now to FIG. 9, a partial, cross-sectional view of a variation of the embodiment of the configuration of the joint interface shown in FIG. 8 is illustrated in accordance with aspects of the present subject matter. As shown, unlike the "H-shaped" sealing member 300 of FIG. 8, the rotor blade assembly includes a "T-shaped" sealing member 400 positioned between the first and second blade segments 24, 26. Specifically, in the illustrated embodiment, the sealing member 400 includes an outer wall portion 442 extending along the exterior of the rotor blade assembly 22 and a joint wall portion 444 extending outwardly from the outer wall portion 442 through the gap 110 defined between the adjacent joint ends 32, 34 of the outer shells 38, 40. As shown, the upper wall portion 442 may be configured to extend outwardly from the joint wall portion 444 such that the outer wall portion 442 overlaps sections of the outer shells 38, 40 along opposed sides of the blade joint 36. Specifically, a section of the outer wall portion 442 may be configured to extend outwardly from the joint wall portion 444 in the direction of the first blade segment 34 to a first end 448 such that the wall portion 442 overlaps the first outer shell 38 along a first overlapping region 450 defined on a first side of the blade joint 36 while an opposed section of the outer wall portion 442 may be configured to extend outwardly from the joint wall portion 444 in the direction of the second blade segment 26 to a second end 454 such that the wall portion 442 overlaps the second outer shell 40 along a second overlapping region 456 defined on a second side of the blade joint 36.

It should be appreciated that, similar to the embodiment described above with reference to FIG. 8, the outer wall portion 442 may be configured to be coupled to the adjacent surfaces of the outer shells 38, 40 at one or more attachment locations 458, 460 defined along both sides of the blade joint 36. Alternatively, the outer wall portion 442 may only be configured to be coupled to the one of the outer shells 38, 40 at one or more attachment locations, such as by only coupling the upper wall portion 442 to the first outer shell 38 (e.g., at attachment location 458) or by only coupling the upper wall portion 442 to the second outer shell 40 (e.g., at attachment location 460).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A jointed rotor blade assembly for a wind turbine, the jointed rotor blade assembly comprising:
    a first blade segment including a first outer shell and a first internal structural component, the first outer shell terminating at a first joint end;
    a second blade segment including a second outer shell and a second internal structural component, the second outer shell terminating at a second joint end, the first and second internal structural components being directly coupled together such that the first and second joint ends are spaced apart from one another by a gap defined between the first and second outer shells at a blade joint defined between the first and second blade segments; and
    a sealing member positioned at least partially between the first and second outer shells, the sealing member including an outer wall portion extending along an exterior of the jointed rotor blade assembly and a joint wall portion extending from the outer wall portion through the gap defined between the first and second outer shells,
    wherein the sealing member is formed from an elastic material.

2. The jointed rotor blade assembly of claim 1, wherein the outer wall portion extends lengthwise between a first end and a second end, the outer wall portion extending outwardly from the joint wall portion along the exterior of the jointed rotor blade assembly such that the outer wall portion overlaps the first outer shell along a first overlapping region defined between the joint wall portion and the first end of the outer wall portion and overlaps the second outer shell along a second overlapping region defined between the joint wall portion and the second end of the outer wall portion.

3. The jointed rotor blade assembly of claim 2, wherein the outer wall portion is coupled to the first outer shell at a first attachment location defined within the first overlapping region.

4. The jointed rotor blade assembly of claim 3, wherein the outer wall portion is coupled to the second outer shell at a second attachment location defined within the second overlapping region.

5. The jointed rotor blade assembly of claim 2, further comprising an inner wall portion extending from the joint wall portion within an interior of the jointed rotor blade assembly such that a section of the inner wall portion extends adjacent to the first outer shell along at least a portion of the first overlapping region and another section of the inner wall portion extends adjacent to the second outer shell along at least a portion of the second overlapping region.

6. The jointed rotor blade assembly of claim 1, wherein the first blade segment corresponds to one of a root segment or a tip segment, the second blade segment corresponding to the other of the root segment or the tip segment.

7. The jointed rotor blade assembly of claim 1, wherein the elastic material is configured to compress and expand with movement of the first and second blade segments to allow the first and second outer shells to move relative to one another at the blade joint.

8. The jointed rotor blade assembly of claim 1, wherein the elastic material has a stiffness that is lower than a stiffness of each of the first and second outer shells.

9. The jointed rotor blade assembly of claim 1, wherein the elastic material corresponds to a rubber material.

10. The jointed rotor blade assembly of claim 1, wherein the sealing member is installed between the first and second outer shells without coupling the outer wall portion of the sealing member to the first and second outer shells.

11. A jointed rotor blade assembly for a wind turbine, the jointed rotor blade assembly comprising:
- a first blade segment including a first outer shell, the first outer shell terminating at a first joint end;
- a second blade segment coupled to the first blade segment at a blade joint defined between the first and second blade segments, the second blade segment including a second outer shell terminating at a second joint end, the first and second joint ends being spaced apart from one another such that a gap is defined between the first and second outer shells at the blade joint; and
- a sealing member positioned at least partially between the first and second outer shells, the sealing member including an outer wall portion extending along an exterior of the jointed rotor blade assembly and a joint wall portion extending from the outer wall portion through the gap defined between the first and second outer shells,
- wherein the sealing member is formed from an elastic material, and
- wherein the sealing member is installed between the first and second outer shells without coupling the outer wall portion of the sealing member to the first and second outer shells.

* * * * *